March 4, 1969  K. G. MOSS  3,430,791
VEHICLE

Filed March 21, 1967  Sheet 1 of 5

Inventor:
Kenneth Geoffrey Moss
By: B.F.Ahlinger
Attorney

United States Patent Office 3,430,791
Patented Mar. 4, 1969

3,430,791
VEHICLE
Kenneth G. Moss, Field House, Pierce Lane,
Fulbourn, Cambridge, England
Filed Mar. 21, 1967, Ser. No. 624,743
Claims priority, application Great Britain, Mar. 23, 1966,
12,710/66
U.S. Cl. 214—505         10 Claims
Int. Cl. B60p 1/02

ABSTRACT OF THE DISCLOSURE

A vehicle having a load carrying platform in which the rear ground engaging wheels are power operated to be movable up-and-down and laterally to lower the platform to the ground and to increase the track of the vehicle respectively so as to facilitate loading of the vehicle from the rear end. Locking means may be provided to prevent unauthorised movement of the ground engaging wheels and the locking means may include means to prevent movement of the wheels up-and-down when the wheels are displaced outwardly from their normal position. A low loading vehicle having such power operated movable wheels is specifically described.

BACKGROUND OF THE INVENTION

Field of the invention

This invention relates to vehicles of the type having a load carrying platform provided with ground engaging wheels at or adjacent each end of the platform. Such vehicles will be referred to herein as "of the type described."

The ground engaging wheels at or adjacent one end of the platform may be driving wheels and may be mounted directly on the platform together with a conventional driver's cab, engine and controls and the like, or they may be provided on a tractor vehicle connected to the load carrying platform through a universal joint to form an articulated vehicle.

Although the invention may be advantageously employed in any vehicle of the type described it is particularly suitable for use in a low loading vehicle of the type described. In low loading vehicles of the type described the load carrying platform is spaced only a short distance above the ground so as to facilitate the loading and carrying of heavy and bulky loads, because the weight of such loads makes it difficult to lift them through a sufficient height to enable them to be loaded upon a vehicle having a load carrying platform at the usual height and in addition, such a vehicle when so loaded would be unstable due to the resultant high centre of gravity.

Description of the prior art

Hitherto in order to enable a low loading vehicle to be loaded it has been necessary, in the majority of cases, to remove completely the rear ground engaging wheels of the load carrying platform so as to enable the platform, at least at the rear end thereof to rest upon the ground during loading operations in order to reduce still further the height to which the load is to be raised and also to enable the load to be maneuvered into position without any obstruction by the rear ground engaging wheels of the vehicle. An example of a typical load is a road roller, or large tracked earth moving machine and in the case of such a load suitable ramps are provided and the load maneuvered under its own power up the ramp onto the load carrying platform of the vehicle.

In its broadest aspect the object of the present invention is to provide a new or improved vehicle of the type described wherein the loading of the vehicle is facilitated.

It has previously been proposed in U.S. Patent No. 2,838,191 to provide means for lowering the rear end of the load carrying platform of a vehicle to the ground and to move the rear ground engaging wheels of the vehicle transversely to facilitate loading. Hitherto this has been achieved by providing a separate ground engaging jack mechanism beneath the load carrying platform of a vehicle which jack mechanism initially raises the platform still farther above the ground from its normal position which results in disconnection of the wheels from the suspension of the vehicle enabling the wheels to be moved transversely apart whereupon the separate jack mechanism is retracted thus lowering the platform to the ground. In a true low loading vehicle because the platform is spaced only a small distance above the ground it is impossible to satisfactorily provide such a separate ground engaging jack mechanism as such a mechanism would be in constant danger of fouling the ground.

It is, therefore, a further object of the present invention to provide a new or improved low loading vehicle wherein the above mentioned disadvantages are avoided and in which loading is facilitated.

SUMMARY OF THE INVENTION

The invention is, in a vehicle including a load carrying a platform having ground engaging wheels at or adjacent one end, means mounting said wheels on said platform for transverse movement between a first position wherein said wheels are in their normal position and a second position wherein said wheels are spaced outwardly of said first position, power means for moving said wheels between said first and second positions, means mounting said wheels for up and down movement relative to said platform and power means for raising and lowering the end of said platform carrying said wheels relative to the ground, the improvement wherein said vehicle includes two wheel carrying beams, one on each side of said platform, each in telescoped relation with a main beam extending transversely of said platform, a suspension arm pivotally mounted on the outer end of each wheel carrying beam for movement in a vertical plane, and one of said ground engaging wheels being carried at the free end of each suspension arm, first fluid actuated ram means operable to cause telescoping of said wheel carrying beams relative to said main beam to move said wheels between said first and second positions, and second fluid actuated ram means connected to said arms to cause pivotal movement of said arms to move said wheels between a first position wherein said wheels are in a lowered position relative to the platform and maintain said platform in its normal position above the ground and a second position wherein said wheels are raised relative to said platform and are maintained out of contact with the ground with part of said platform resting on the ground.

BRIEF DESCRIPTION OF THE DRAWINGS

Two low loading vehicles constructed in accordance with the invention will now be described by way of example with reference to the accompanying drawings wherein.

DESCRIPTION OF THE PREFERRED EMBODIMENT

Figure 1:
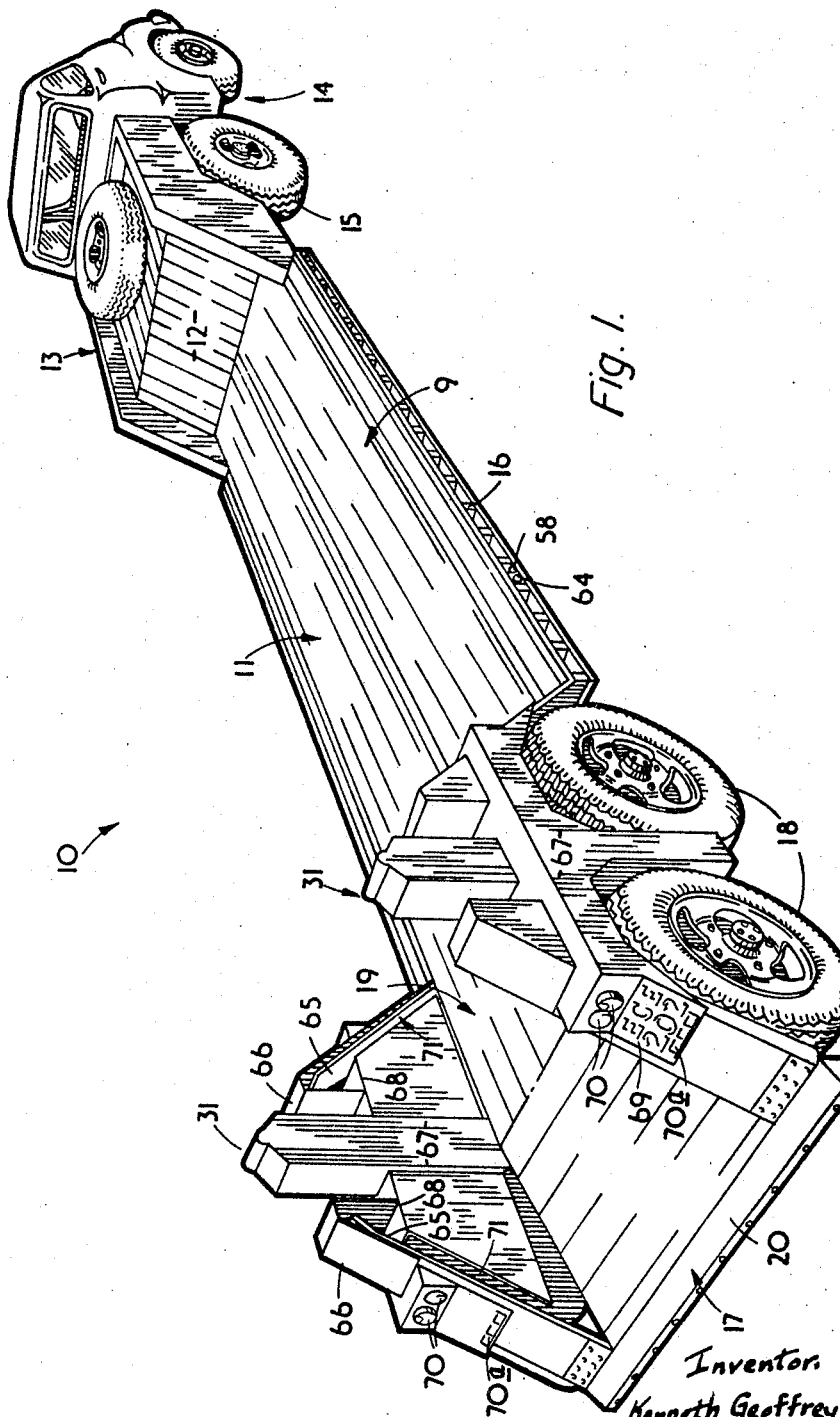
FIGURE 1 is a perspective view of a low loading vehicle according to the invention showing the wheels in the normal position for driving.
Figure 2:
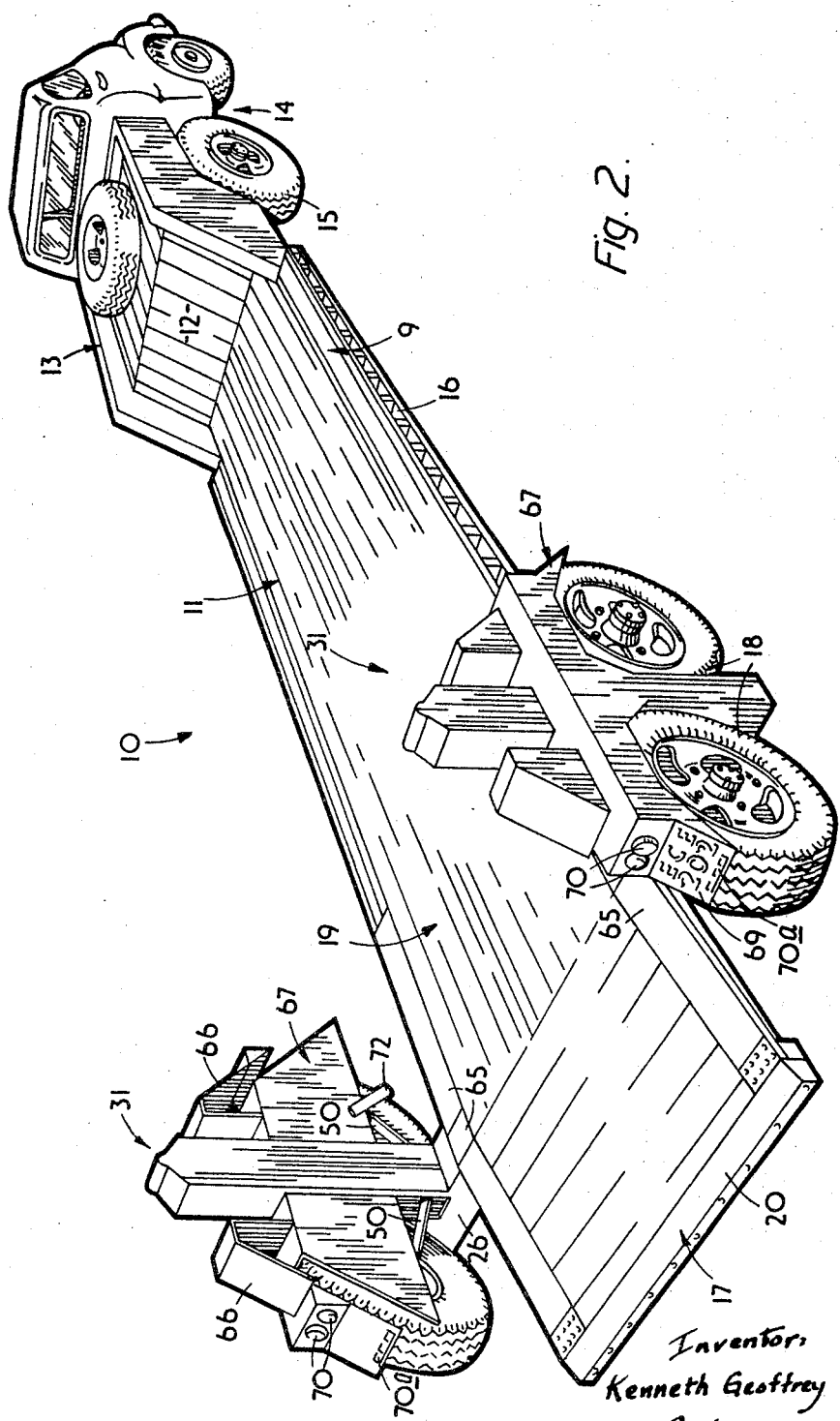
FIGURE 2 is a perspective view of the low loading vehicle of FIGURE 1, showing the vehicle in position for loading.

In the first embodiment, referring to FIGURES 1 and 2, a low loading articulated vehicle, indicated generally at 10, comprises a generally flat load carrying platform 11 which at its front end is provided with a part 12 which extends generally upwardly and with a horizontal forwardly extending part 13 which is provided, on its under surface, with connecting means (not shown) which removably engages with a turntable arrangement provided upon the chassis of a four wheeled tractor vehicle 14 which provides the ground engaging driving wheels 15 for the vehicle. The load carrying platform 11 adjacent the rear end 17 thereof is provided with ground engaging wheels 18.

From the above brief description it will be appreciated that the low loader 10, except for the mounting of the rear ground engaging wheels 18 on the platform 11 is a standard articulated low loading vehicle and hence, only the above mentioned difference will be described in detail hereinafter.

If desired, a nonarticulated low loading vehicle or a vehicle having a normal level load carrying platform could be advantageously provided with the present invention.

The platform 11 is of generally conventional construction and includes a main part 9 bounded by two longitudinally extending side members 16 and transversely extending members (not shown). The platform 11, adjacent the rear end 17 thereof, is of reduced width to provide recesses within which the ground engaging wheels 18 lie so that they do not project outwardly beyond the sides of the main part 9 of the platform 11. The part 19 of the platform between the wheels is, therefore, of reduced width and lies in the same plane as the main part 9 of the platform forwardly of a position approximately midway between each pair of wheels 18 whilst to the rear of this position it is inclined downwardly towards the rear end 17 of the platform 11. At the extreme end of the platform 11 a transversely extending member 20 is provided which is of a width equal to that of the main part 9 of the platform.

Figure 4:
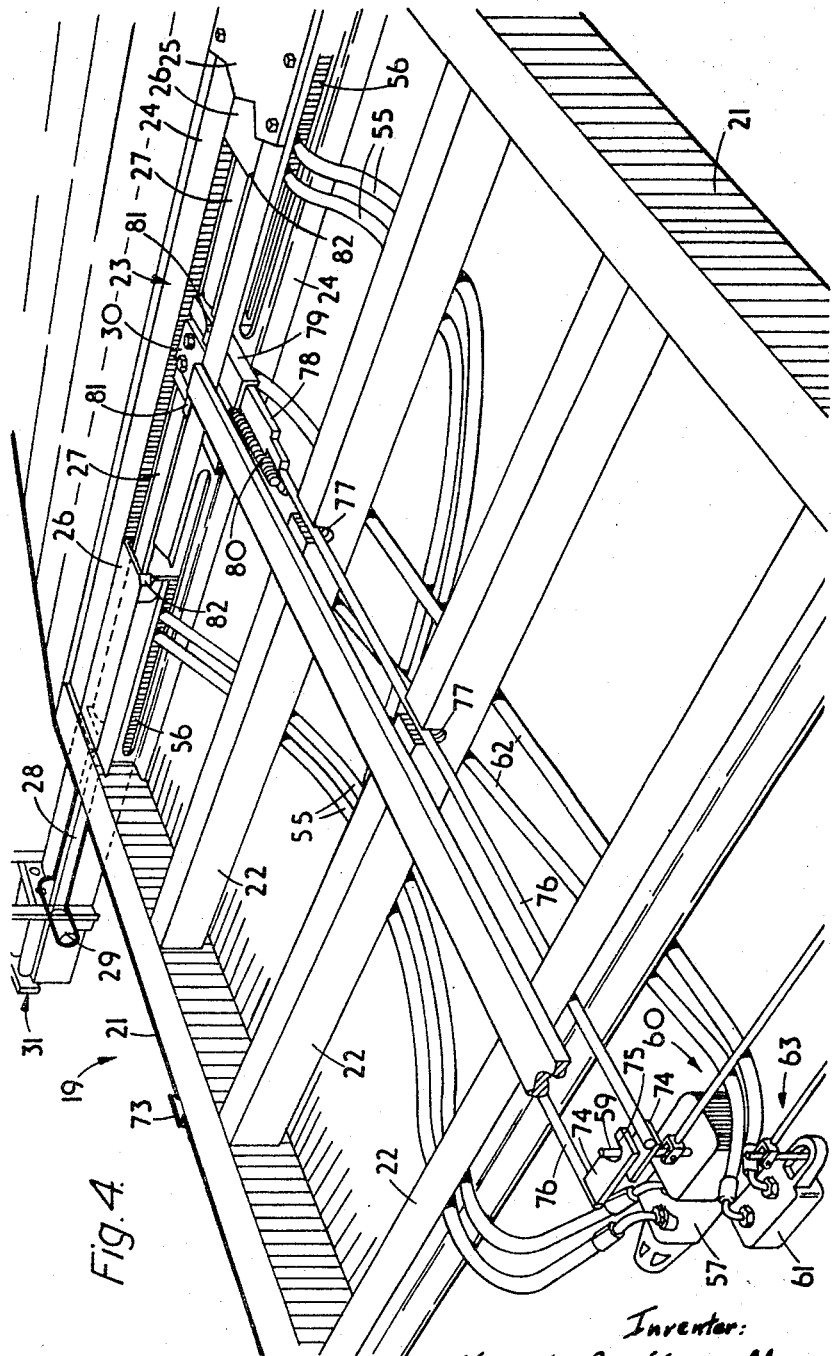
FIGURE 4 is a fragmentary perspective view to an enlarged scale of a portion of the platform of the low loading vehicle of FIGURE 1, with some of the floor plates removed to show the operating mechanism and, FIGURE 5 is a diagrammatic fragmentary side elevation showing an alternative arrangement of pillar and wheel in a different embodiment of the invention.

The part 19 of the platform is shown in more detail in FIGURE 4 in which the floor plates have been removed to expose the interior of the platform. As will be seen from FIGURE 4 the part 19 has longitudinally extending side members 21, connected at their forward ends to the rear ends of the members 16, and transversely extending members 22.

At a position midway between the wheels 18 a main transversely extending box section member 23 is provided. This member 23 is made up from two spaced apart channel-section members 24 arranged with their flanges extending in opposite directions forwardly and rearwardly of the platform and there being a flat plate 25 bolted to the top and bottom surfaces of the top and bottom flanges respectively.

Engaged within each end of the main transverse beam 23 are two further box section beams 26 and these further beams 26 are of such size that they are slidable telescopically within the beam 23. If desired, suitable bearing means may be provided between the beam 23 and the further beams 26 to facilitate sliding of the further beams 26 within the main beam 23.

With the above mentioned arrangement of a single main beam 23 and two further beams 26 telescopically engaged therewithin the maximum extension of the wheels which is obtainable is limited and in order to obtain a greater extension, two main beams 23 may be provided extending across the whole width of the platform 11. These two beams could be arranged either one in front of the other or one above the other and a further beam 26 of substantially the same length as the main beam 23 would be engaged within each beam 23 together with an associated hydraulic piston and cylinder unit and thus a considerably greater width of extension of the wheels could be achieved. In this case suitable alterations to the outer ends of the further beams 26 would be required so that the axes of rotation of the wheels on opposite sides of the platform would be in alignment.

Returning now to the arrangement shown in the drawings, a hydraulic cylinder 27 is arranged within each further beam 26 with its piston rod 28, connected to a rod 29 carried at the outer end of its associated further beam 26 and the cylinder 27 is secured to a fixed bracket 30 provided in the centre of the main beam 23, so that on operation of the hydraulic piston and cylinder units the further beams 26 are caused to telescope into and out of the main beam 23.

Figure 3:
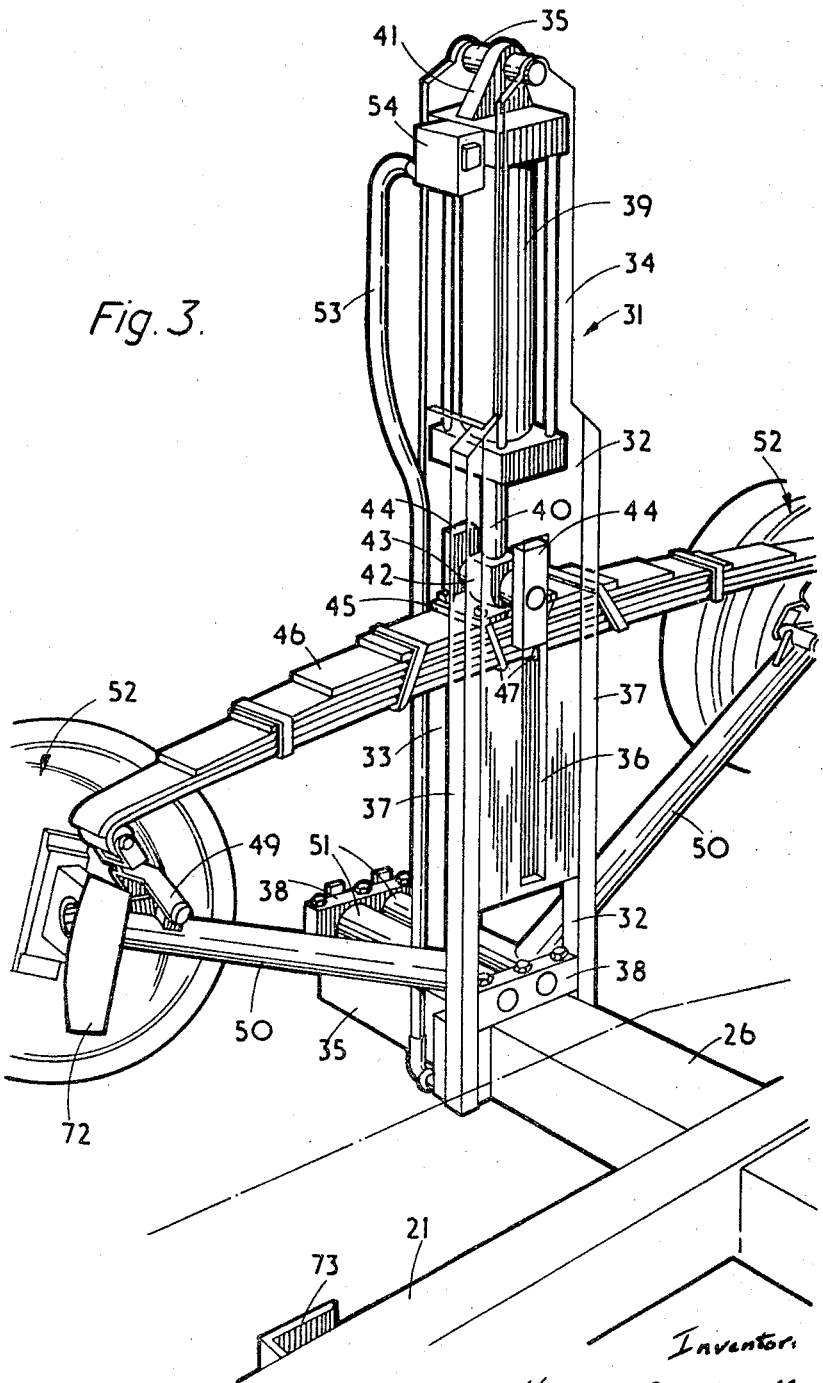
FIGURE 3 is a fragmentary perspective view to an enlarged scale of one of the wheel carrying pillars of the low loading vehicle of FIGURE 1, showing the pillar itself in ghost outline to illustrate the mechanism provided within the pillar.

Each further beam 26 at its outer end is provided with an upstanding vertical pillar 31. Referring now more particularly to FIGURE 3 each pillar 31 is a generally box shaped member having side walls 32 and front and rear walls 33. At their upper ends the side walls 32 are formed with an integral extension part 34 of reduced width which provides an upper extension of the pillar and a pin 35 is secured between the free ends of the extension parts 34. The front and rear walls 33 at their lower ends are rigidly secured to the side walls 35 of their associated further beam 26. A vertically extending slot 36 is formed in each side wall 32 over the majority of its length whilst the inner edges of the post are reinforced by members 37. Two transversely extending bracket members 38 are provided on each further beam 26 and the inner one of the two bracket members 38 is also secured to the front and rear walls 33 of the pillar 31.

The cylinder 39 of a hydraulic ram is provided at its one end with a triangular bracket 41 and the bracket 41 is formed with an aperture within which the hereinbefore mentioned pin 35 is engaged so that the hydraulic ram is carried within the pillar 31 with the piston rod 40 thereof depending downwardly. The free end of the piston rod 40 carries an apertured bracket 42 within which is engaged a further pin 43 at the outer ends of which are carried guide plates 44 of such dimensions as to be slidable within the slots 36 formed in the side plates 32. The bracket 43 carries a plate 45 to which a leaf spring 46 is clamped by U-bolts 47.

The free ends of the spring 46 are pivotally connected through links 49 to the outer ends of trailing and leading suspension arms 50 which are connected at their inner ends to tubular axle members 51 pivotally mounted in the hereinbefore mentioned bracket members 38. The suspension arms 50 at their outer ends carry the stub axles and brake drums (indicated at 52) for the ground engaging wheels 18 of the vehicle.

The hydraulic fluid supply to each cylinder 39 is fed through a conduit 53 and a hydraulic valve lock 54 of conventional form is provided in the fluid supply line.

Each further beam 26 has attached thereto, referring now to FIGURE 4, flexible pipes for the supply of hydraulic fluid to the cylinders 39 in the pillars 31, for the supply of fluid to the brakes of the vehicle and also for the statutory lighting of the vehicle. These flexible pipes and cables 55 are connected at their one end to their associated further beam 26 to communicate with further pipes and cables (not shown) in the beams 26 which extend into the pillars 31 and thence to their respective devices.

The pipes and cables 55 themselves pass through a longitudinally extending slot 56 formed in one side wall of the main beam 23 to enable the pipes and cables 55 to move transversely with the further beams 26 during movement thereof. The pipes and cables 55 are connected at their other ends to corresponding fixed pipes and cables provided on the load carrying platform 11 of the vehicle, the hydraulic pipes being connected to a valve 57.

The valve 57 controls the supply of fluid to the pillar cylinders 39 by movement of the operating lever 59 thereof which is operated through linkage 60 by a hand engageable lever 58, provided on the platform 11 and arranged on one side thereof, as shown in FIGURE 1. A further hydraulic control valve 61 is provided on the platform 11 to control the supply of fluid to the "transverse" cylinders 27 through pipes 62. This valve 61 is operated through a similar linkage 63 from a hand engageable lever 64 also provided on the platform 11 adjacent the hand engageable lever 58.

Referring now to FIGURES 1 and 2, the rectangular recesses hereinbefore mentioned formed in the platform 11 on either side of the region 19 may be bridged when the wheels are expanded so that the platform 11 is of constant width along the whole length thereof, by means of bridging plates 65 which are pivotally mounted on the platform, the two forward bridging plates being pivotally mounted on the platform 11 and the two rear plates pivotally mounted on the member 20. The plates 65 lie parallel to their associated part of the platform 11 as shown in FIGURE 2 when they are in their operative position. When the ground engaging wheels 18 are moved inwardly the plates 65 are raised until they are at an angle of approximately 45° and the plates 65 are maintained in this raised position by engagement within mudguards 66 of the vehicle.

The vertical pillars 31 are surrounded by a protective housing 67, shown in FIGURES 1 and 2 but which is not shown in FIGURE 3 for clarity, and these housings 67 also provide the mudguards 66 which are arranged to enclose the bridging plates 65 in their raised position as shown in FIGURE 1, the bridging plates 65 being held in their inclined position by engagement with a part 68 of the housing 67. The housing 67 also carries the necessary number plate 69, the rear end and brake lights 70 and reflectors 70a of the vehicle. The mudguards 66 are arranged with an opening 71 on their inner side to enable the bridging plates 65 to be slid into and out of the mudguards 66 as the wheels 18 are moved transversely.

The vehicle is provided with a number of safety devices and these will be described hereinafter but firstly the manner of operation of the vehicle will be described to facilitate understanding of the safety devices.

Considering the vehicle 10 in its normal position for driving upon the road, i.e., the position shown in FIGURE 1. The piston rod 40 of the cylinder 39 is extended outwardly to its maximum extent and so the plate 45 is arranged at the lower limit of its travel so that the leaf spring 46 is pushed downwardly and, therefore, pushes the free ends of the trailing and leading suspension arms 50 downwardly so that they are inclined outwardly and rearwardly and forwardly respectively, from their pivotal connection of their associated beams 26. This downwards inclination of the arms 50 causes the platform 11 of the low loader to be maintained above the road surface in its normal position. The further beams 26 are also withdrawn into the main beam 23 so that the ground engaging wheels are in their closed position and lie within the recesses in the platform 11.

When it is desired to load the vehicle the hand engageable lever 58 is pulled to move the lever 59 of the valve 57 through the linkage 60 thus causing hydraulic fluid to be fed to the underside of the pistons in the cylinders 39 in the pillars 31, thereby moving each plate 45 upwardly and hence moving the leaf springs 46 upwardly and thus allowing the suspension arms 50 to pivot about their pivotal connection and to assume a position in which their free ends are inclined upwardly as shown in FIGURES 2 and 3.

This pivotal movement of the suspension arms 50 firstly causes the low loading platform 11 to be lowered onto the ground and then raising the wheels 18 clear of the ground.

When the wheels 18 have been lifted out of contact with the ground the hand engageable lever 64 is pulled to operate the valve 61 through linkage 63 thereby causing hydraulic fluid to be fed to the "transverse" cylinders 27 to force the piston rods 28 therein outwardly and so telescope the beams 26 outwardly from within the main beam 23 and hence move the wheels 18 apart. The vehicle is now in the position shown in FIGURE 2.

When the wheels have been thus moved apart, in order to facilitate loading of the vehicle, which is done from the rear plate of the vehicle 17 in between the now moved apart wheels 18 the recesses in the side edges of the vehicles (which accommodate the wheels, pillars and suspension arms in the closed position thereof) are bridged by means of the bridging plates 65 as mentioned hereinbefore.

By repeating the above mentioned sequence of operations the vehicle may be restored to its normal operating position.

The safety devices will now be described.

Firstly, in order to prevent accidental collapse of the cylinders 39 in the pillars 31 the valve locks 54 hereinbefore mentioned are provided. These valve locks prevent exit of fluid from above the pistons in the cylinders 39 unless hydraulic fluid is supplied to the interior of the cylinders to extend the piston rods still further. These valve locks are of conventional form and do not need further description.

Secondly, in order to prevent accidental extension of the further beams 26 outwardly from the main beam 23 whilst the vehicle is in motion, plate and socket locking means are provided. These locking means comprise a spring steel plate 72 carried at the free end of each leading suspension arm 50, see FIGURES 2 and 3, each plate 72 being adapted to engage within a socket 73 fixed on the platform 11 when the wheels are in their closed position. The plates 72 automatically disengage from the sockets 73 when the wheels are raised.

Thirdly, a locking mechanism is provided to prevent operation of the pillar cylinders 39 when the further beams 26 are extended from within the main beam 23. This locking mechanism is shown in FIGURE 4, and comprises two plates 74 each having a U-shaped recess 75 formed in an edge, which recesses are arranged to engage the operating lever 59 of the "pillar" valve 60 and so prevent movement thereof by the hand engageable lever 58 through the linkage 60. Each plate 74 is carried at the one end of a rod 76 which extends through apertures (not shown) in one of the transverse members 22 and through slots 77 formed in the other transverse members 22. Each rod 76 carries a latch member 78 at its other end which is guided for sliding movement within a guide 79 fixed to the main member 23. A coil tension spring 70 is connected between each rod 76 and fixed part of the platform 11 to urge the latch members 78 towards the interior of the member 23. The latch members 78 have angled corners 81 which co-operate with angled corners 82 formed on the further beams 26.

Thus, when the further beams 26 are moved outwardly the latch members 78 are urged towards the interior of the beam 23 and so the recesses 75 engage around the lever 58 of the valve 60 and so prevent movement thereof. This position is shown in FIGURE 4. When the further beams 26 are moved inwardly the angled corners 82 thereof engage the angled corners 81 of the latch members 78 and move them outwardly, and so disengage the slots 75 from the lever 59. Thus, the lever 59 can be moved to operate the valve 57 to operate the pillar cylinders when the further beams 26 are in their closed position but cannot be moved when they are extended and thus the vehicle cannot be driven with the wheels in their extended position.

The hydraulic system is provided with hydraulic fluid under pressure from a reservoir (not shown) by means of a suitable pump (also not shown) driven by the engine of the vehicle.

Figure 5:
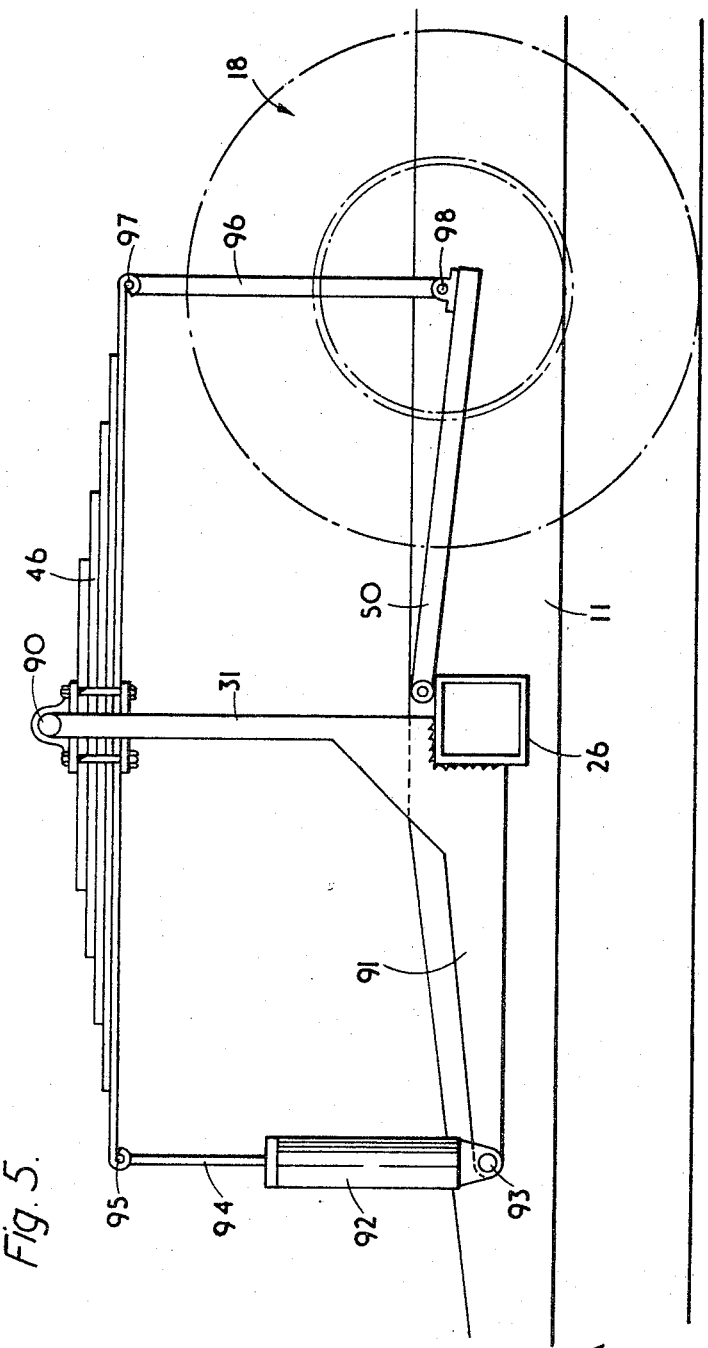

A second embodiment of the invention which is illustrated diagrammatically in FIGURE 5 is concerned with low loading vehicles similar to that described hereinbefore, but with only a single ground engaging wheel at each side of the load carrying platform of the vehicle, instead of the tandem wheels hereinbefore described. In FIGURE 5 the platform of the vehicle is indicated at 11 and one of the further transversely extending beams is indicated at 26. The vertical pillar is indicated at 31 and the suspension arm at 50, whilst the ground engaging wheel is indicated at 18. It will be seen that in this embodiment the suspension arm 50 is a leading arm although it should be appreciated that if desired a trailing arm may be provided in which case the arrangement of FIGURE 5 would be reversed.

In this embodiment the leaf spring 46 is pivotally connected to the upper end of the pillar 31 as shown at 90. The beam 26 carries a rearwardly extending arm 91 to which the cylinder 92 of a hydraulic ram unit is pivotally connected as shown at 93. The piston rod 94 of the ram unit is pivotally connected to one end of the spring 46 as indicated at 95 whilst the other end of the spring 46 is pivotally connected to link 96 as indicated at 97, the other end of the link 96 being pivotally connected to the suspension arm 50 as indicated at 98.

The remainder of the construction of the vehicle is as described in connection with the first embodiment and the transverse movement of the beams 26 is also similar. The hydraulic connection to the cylinders 92 are similar to those of the "pillar" cylinders 29 of the first embodiment and it will be seen that when hydraulic fluid is supplied to the cylinder to act on the piston therein so as to force the piston rod 94 thereof outwardly then the spring 46 is caused to pivot around its pivotal connection 90 to pillar 31 and so, the suspension arm 50 is caused to pivot downwardly to its normal position. When it is desired to lower the load carrying platform 11 to the ground then hydraulic fluid is fed to the cylinders 92 to withdraw the piston rods 94 and this causes each spring 46 to pivot about its pivotal connection 90 to the pillar 31 and so lift the suspension arm 50 upwardly and thus lower the platform to the ground and then lift the wheels 18 out of contact with the ground, transverse movement of the further beams 26 is then caused as in the first embodiment and similar safety devices may also be provided.

It will be appreciated that the mechanism hereinbefore described is particularly advantageously employed in a low-loading vehicle as all the mechanism is mounted within the load carrying platform of the vehicle and thus there are no parts to be mounted underneath the platform. This is an important feature in low-loading vehicles because of the small separation between the platform and the ground which prevents the mounting of any parts beneath the platform as they would be in constant danger of fouling the ground during use of the vehicle.

The mechanism of the present invention may, however, be advantageously used in all vehicles including vehicles having a normal level load carrying platform due to the simplicity, ruggedness and reliability of the mechanism of the present invention.

What I then claim is:

1. In a vehicle including a load carrying platform having ground engaging wheels at or adjacent one end, means mounting said wheels on said platform for transverse movement between a first position wherein said wheels are in their normal position and a second position wherein said wheels are spaced outwardly of said first position, power means for moving said wheels between said first and second positions, means mounting said wheels for up and down movement relative to said platform and power means for raising and lowering the end of said platform carrying said wheels relative to the ground, the improvement wherein said vehicle includes two wheel carrying beams, one on each side of said platform, each in telescoped relation with a main beam extending transversely of said platform, a suspension arm pivotally mounted on the outer end of each wheel carrying beam for movement in a vertical plane and one of said ground engaging wheels being carried at the free end of each suspension arm, first fluid actuated ram means operable to cause telescoping of said wheel carrying beams relative to said main beam to move said wheels between said first and second positions, and second fluid actuated ram means connected to said arms to cause pivotal movement of said arms to move said wheels between a first position wherein said wheels are in a lowered position relative to the platform and maintain said platform in its normal position about the ground and a second position wherein said wheels are raised relative to said platform and are maintained out of contact with the ground, with part of said platform resting on the ground.

2. The improvement according to claim 1, wherein when said wheels are in said first lowered position the axis of rotation of said wheels is not substantially below said load carrying platform.

3. The improvement according to claim 1, including a single main beam extending across the full width of the platform with said wheel carrying beams being telescopically engaged with opposite ends of said main beam.

4. The improvement according to claim 1, including a single suspension arm on each wheel carrying beam, a pillar carried on each wheel carrying beam and a leaf spring pivotally mounted, adjacent its midpoint, on each pillar, an end of each spring being connected to the associated suspension arm and the other end of said spring being connected to said second ram means.

5. The improvement according to claim 1, including two suspension arms on each wheel carrying beam, a pillar carried on each wheel carrying beam, and a leaf spring slidably mounted, adjacent its midpoint, on said pillar for up-and-down movement relative thereto, the ends of said spring being connected to the associated suspension arms and said second ram means acting on said spring to cause said spring to slide up-and-down relative to said pillar.

6. The improvement according to claim 1, including recesses provided in each side of said platform to receive said wheels when they are in said first position, bridging plates being provided for the recesses, movable between a position wherein they bridge their associated recess so that said platform is of substantially constant width throughout its length, and a position wherein they permit said wheels to enter said recesses.

7. The improvement according to claim 1, including hydraulic valve lock means provided in the hydraulic fluid supply to said second ram means to prevent accidental exit of fluid from said cylinders.

8. The improvement according to claim 1, including a socket member fixed on a side of said platform and a plate secured to a suspension arm on said side of said platform, said plate being engageable within said socket on lowering the wheels into said first position to prevent transverse movement of the wheel carrying beams associated with aid suspenison arm and being disengageable from said socket member when the wheels are raised into said second position to enable transverse movement of said beam.

9. The improvement according to claim 1, including a latch member movable, as a result of engagement with a portion associated with a wheel carrying beam, between an operative position wherein it is operative to prevent passage of fluid to said second ram means when said wheels are displaced transversely from said first position and an inoperative position wherein it is operative to allow passage of fluid to said ram means when said wheels are in said first position.

10. The improvement according to claim 9, wherein the latch member is acted upon by an inner end part of its associated wheel carrying beam to be displaced outwardly of the direction of movement of the beam, as the beam moves inwardly, into its operative position, there being biasing means to urge the latch member into the path of its associated beam and wherein fluid is fed to said ram means by a valve having an operating lever, a member associated with said latch member engaging with said operating lever when said latch member is in its operative position to prevent movement of said lever.

References Cited

UNITED STATES PATENTS

| | | | |
|---|---|---|---|
| 2,838,191 | 6/1958 | Schramm | 214—505 |
| 2,905,345 | 9/1959 | Schramm | 214—505 |
| 3,000,523 | 9/1961 | Nicolas | 214—505 |
| 3,362,553 | 1/1968 | Weinmann | 214—505 |

ALBERT J. MAKAY, *Primary Examiner.*

U.S. Cl. X.R.

280—43.23, 34